United States Patent
Osborn et al.

(10) Patent No.: US 12,477,046 B2
(45) Date of Patent: Nov. 18, 2025

(54) ACCOUNT AGGREGATION AND CACHING SYSTEMS AND METHODS

(71) Applicant: Capital One Services, LLC, McLean, VA (US)

(72) Inventors: Kevin Osborn, Newton Highlands, MA (US); Samuel Rapowitz, Roswell, GA (US)

(73) Assignee: Capital One Services, LLC, McLean, VA (US)

( * ) Notice: Subject to any disclaimer, the term of this patent is extended or adjusted under 35 U.S.C. 154(b) by 59 days.

(21) Appl. No.: 18/440,426

(22) Filed: Feb. 13, 2024

(65) Prior Publication Data

US 2025/0260750 A1   Aug. 14, 2025

(51) Int. Cl.
*G06F 13/00* (2006.01)
*H04L 9/40* (2022.01)
*H04L 67/568* (2022.01)

(52) U.S. Cl.
CPC ............ *H04L 67/568* (2022.05); *H04L 63/08* (2013.01)

(58) Field of Classification Search
CPC ............................. H04L 67/568; H04L 63/08
USPC ................ 709/217–219, 203; 703/13, 21, 22
See application file for complete search history.

(56) References Cited

U.S. PATENT DOCUMENTS

| | | | |
|---|---|---|---|
| 9,595,023 B1 | 3/2017 | Hockey et al. | |
| 11,797,635 B2* | 10/2023 | Keslin | G06F 40/131 |
| 11,887,069 B2* | 1/2024 | Lai | G06Q 40/02 |
| 2021/0350340 A1 | 11/2021 | Lai et al. | |
| 2022/0318333 A1* | 10/2022 | Keslin | G06F 40/123 |
| 2024/0086490 A1* | 3/2024 | Keslin | G06F 40/103 |
| 2024/0119003 A1* | 4/2024 | Tobkin | G06F 12/0842 |

* cited by examiner

*Primary Examiner* — Kenneth R Coulter
(74) *Attorney, Agent, or Firm* — Banner & Witcoff, Ltd.

(57) ABSTRACT

Techniques for improved management of data may include the aggregation of connections with data sources, the aggregation of data, and/or the dynamic caching of data using data caching models. The caching model(s) may be adaptable based on data characteristics, user information, and/or usage information.

20 Claims, 4 Drawing Sheets

ACCOUNT AGGREGATION AND CACHING SYSTEMS AND METHODS

FIELD OF USE

Aspects of the disclosure relate generally to account aggregation systems, including monitoring and maintaining aggregated connections and dynamically caching accessible data via the aggregated connection(s).

BACKGROUND

Conventional aggregation systems, such as financial aggregators, consolidate and streamline information from various sources to provide users with a comprehensive overview of their data. These systems typically aggregate data from multiple accounts, institutions, or products, offering users a centralized view of their data (e.g., financial assets, liabilities, income, and expenses). Such techniques typically disconnect or time out due to security or operational cost and/or performance reasons, resulting in increased downtime, occurrences in which data is outdated, and/or required reconnection/reestablishment operations.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

Aspects described herein generally improve the management of aggregated connections with data sources, the aggregation of data, and/or the caching of data (e.g., based on one or more caching models). According to some aspects, these and other benefits may be achieved by dynamically caching data based on one or more characteristics of the data. The data characteristics may include usage information (e.g., caching for infrequent users may be reduced, such as set to on-demand caching, while frequent user access may result in more aggressive caching, such as read-ahead caching operations), temporal information (e.g., date, time, etc.), user and/or data types, user and/or data classifications, account information, historical information, data and/or usage statistics, transaction information (e.g., financial transaction type, transaction classification, transaction amount, date and/or time of the transaction(s), etc.), user information (e.g., which may include user identification information), and/or other information or data.

According to one or more aspects, the management of aggregated data (and/or connections) and/or the data caching may be include monitoring the access and usage of the data by one or more users. For example, this may include dynamically adjusting the quantity, type, and/or frequency of data that is cached based on whether the cached data is actually utilized by the user(s) and/or other system component(s).

A system of one or more computers may be configured to perform particular operations or actions by virtue of having software, firmware, hardware, or a combination of them installed on the system that in operation causes or cause the system to perform the actions. One or more computer programs may be configured to perform particular operations or actions by virtue of including instructions that, when executed by data processing apparatus, cause the apparatus to perform the actions. As such, corresponding apparatus, systems, and computer-readable media are also within the scope of the disclosure.

These features, along with many others, are discussed in greater detail below.

BRIEF DESCRIPTION OF THE DRAWINGS

The present disclosure is described by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects discussed herein may relate to the management of aggregated connections with data sources (e.g., via one or more application programming interfaces (API)), aggregation of data, and/or caching of data (e.g., based on one or more caching models). The caching model(s) may include one or more machine learning (ML) caching models. The data caching may include dynamically caching based on one or more data characteristics, which may include, for example: usage information (e.g., caching for infrequent users may be reduced, such as set to on-demand caching, while frequent user access may result in more aggressive caching, such as read-ahead caching operations), temporal information (e.g., date, time, etc.), user and/or data types, user and/or data classifications, account information, historical information, data and/or usage statistics, transaction information (e.g., financial transaction type, transaction classification, transaction amount, date and/or time of the transaction(s), etc.), user information (e.g., which may include user identification information), and/or other information or data.

The management of aggregated data (and/or connections) and/or the data caching may include monitoring the access and usage of the data by one or more users. For example, this may include dynamically adjusting the quantity, type, and/or frequency of data that is cached based on whether the cached data is utilized by the user(s) and/or other system component(s). To determine access and/or usage of cached data that is provided (e.g., from the caching entity) to one or more other entities, a unique identifier associated with the cached data may be determined and provided back to the caching entity. This identifier may be used to notify the caching entity of the usage and/or access of the cached data at (and/or via) the other entit(ies). This notification may facilitate the adaptation and/or adjustment of a future caching operation, and/or the adaptation of caching model(s). For example, the identifier and associated notification may indicate the usage of the cached data, where the degree of usage may be used to improve the future caching operation(s). In this example, if the notification indicates that the cached data was not used and/or used to a lesser degree than anticipated, the future caching operation(s) may be adjusted to adjust (e.g., reduce) the amount of similar data cached by the future caching operation(s). The determination of the unique identifier may include hashing the cached data to generate a hash corresponding to the cached data and/or determining a feature vector representing the cached data.

Before discussing the concepts of the disclosure in greater detail, however, several examples of a computing device that may be used in implementing and/or otherwise providing various aspects of the disclosure will first be discussed with respect to FIG. 1. Although some aspects may be described with respect to the aggregation and caching of data associated with financial transactions and usable by financial managers (e.g., personal finance management (PFM) applications and/or services), the present disclosure is not limited thereto and one or more aspects of the disclosure may be employed in other data aggregation and/or data caching implementations.

Figure 1:
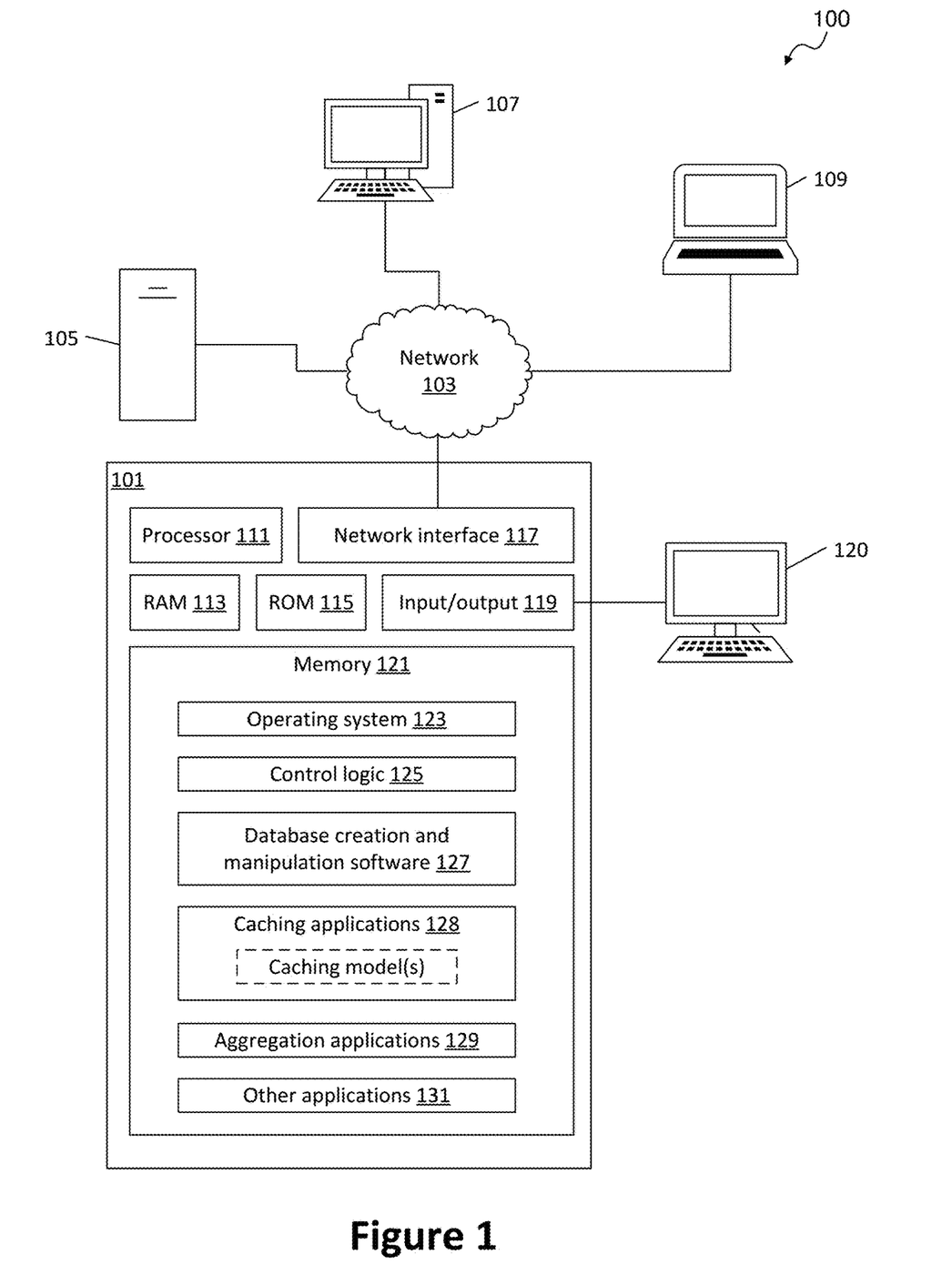
FIG. 1 shows an example computing device in accordance with one or more aspects described herein.

FIG. 1 illustrates one example of a computing device 101 that may be used to implement one or more illustrative aspects discussed herein. For example, the computing device 101 may, in some aspects, implement one or more aspects of the disclosure by reading and/or executing instructions and performing one or more actions based on the instructions. In some aspects, the computing device 101 may represent, be incorporated in, and/or include various devices such as a desktop computer, a computer server, cloud server, a mobile device (e.g., a laptop computer, a tablet computer, a smart phone, any other types of mobile computing devices, and the like), and/or any other type of data processing device. In an exemplary aspect, the computing device 101 may be embodied as a server (e.g. cloud server) adapted to execute one or more cloud-based application, such as one or more "serverless" applications, to perform aspect(s) of the disclosure.

The computing device 101 may, in some aspects, operate in a networked environment. In others, the computing device 101 may operate in a standalone environment. As shown in FIG. 1, various network nodes 101, 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topologies and may use one or more of a variety of different protocols, such as Ethernet. Devices 101, 105, 107, 109, and other devices (not shown) may be connected to one or more of the networks via twisted pair wires, coaxial cable, fiber optics, radio waves, or other communication media. Additionally, or alternatively, the computing device 101 and/or the network nodes 105, 107, and 109 may be a server hosting one or more databases. Databases may include, but are not limited to relational databases, non-relational databases, hierarchical databases, distributed databases, in-memory databases, flat file databases, XML databases, NoSQL databases, graph databases, and/or a combination thereof.

As seen in FIG. 1, the computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with database operations. Input/output 119 may include a variety of interface units and drives for reading, writing, displaying, and/or printing data or files. Input/output 119 may be coupled with a display such as display 120. Memory 121 may store software for configuring computing device 101 into a special purpose computing device in order to perform one or more of the various functions discussed herein. Memory 121 may store operating system software 123 for controlling overall operation of the computing device 101, control logic 125 for instructing the computing device 101 to perform aspects discussed herein, database creation and manipulation software 127, aggregation applications 128, caching applications 129, and other application(s) 131. Control logic 125 may be incorporated in and may be a part of database creation and manipulation software 127. In other aspects, the computing device 101 may include two or more of any and/or all of these components (e.g., two or more processors, two or more memories, etc.) and/or other components and/or subsystems not illustrated here. Aspects of the computing device 101 may be implemented in a serverless architecture, including being part of a virtual private cloud (VPC) of a cloud server. In this example, the computing device 101 may be a cloud server hosting one or more VPCs. Additionally, or alternatively, one or more of the applications (e.g., control logic 125, database creation and manipulation software 127, aggregation application(s) 128, caching application(s) 129, and/or other application(s) 131) may include one or more anonymous functions, such as one or more Lambda functions, configured to perform the respective functions of the application(s).

The aggregation application(s) 128 may include one or more applications configured to perform data and/or resource aggregation operations, which may include the aggregation of one or more connections with other entities. Additionally, or alternatively, the aggregation application may monitor and/or adjust (e.g., establishing, terminating, restoring, etc.) connections with one or more data sources (of the aggregated data) and/or devices configured to access and/or otherwise utilize data associated with the data source(s). In one or more aspects, the monitoring of the connection(s) with the data source(s) and/or device(s) may be based on a caching status determined by the caching application(s) 129. The caching status may include: whether previous caching operation(s) successfully completed, a progress of one or more current caching operations, one or more quantities of data cached, error state(s), and/or one or more other parameters and/or information associated with caching operation(s). For example, the caching status may indicate that a caching operation failed to complete. Using this information, the aggregation application 128 may determine that one or more connections (e.g. via an API) with data source(s) have been terminated or are otherwise unavailable.

The caching application(s) 129 may include one or more caching models configured to perform data caching, including dynamic data caching, based on one or more characteristics, such as user characteristics, data characteristics, and/or one or more other characteristics and/or parameters. The caching model(s) may be configured to predict, anticipate and/or otherwise determine data to be subsequently requested and/or otherwise accessed and/or used. The predicted data may then be preemptively cached to facilitate access to the data with improved efficiency and access speeds, as well as provides an increased availability of the data in the event of a terminated and/or degraded communicative connection with the data source.

In one or more aspects, the characteristics may include usage information, temporal information (e.g., date, time, etc.), user and/or data types, user and/or data classifications, account information, historical information (e.g., user behavioral information corresponding to past user behavior(s)), data and/or usage statistics, transaction information (e.g., financial transaction type, transaction classification, transaction amount, date and/or time of the transaction(s), etc.), user information (e.g., which may include user identification information), and/or other information or data. Additionally, or alternatively, the caching application(s) 129 may perform scheduled data caching and/or on-demand caching. In one or more aspects, the scheduled data caching may be dynamically adjusted based on one or more of the characteristics.

The data caching model(s) may include one or more ML caching models that may be automatically adapted based on one or more characteristics (e.g., user characteristics, data characteristics, and/or one or more other characteristics and/or parameters), data and/or information provided to (e.g., by the aggregation application(s) 128) and/or accessed by the caching application(s) 129, and/or data and/or information generated by the caching application(s) 129.

The usage information may indicate the frequency and/or degree in which the data is accessed and/or otherwise used by the user(s) and/or other entities. For example, the usage information may indicate an infrequent use of the data by a user, and this information may be used by the caching application(s) 129 to, for example, adjust one or more caching operations, such as adjusting (e.g., reducing) the frequency and/or quantity of data caching, adjust a type or other characteristic of the data that is to be cached, and/or adjust one or more other characteristics of current and/or future caching operations. In another example where the usage information may indicate a frequent use of the data by the user, the usage information may be used to increase the frequency and/or quantity of data caching, adjust a type or other characteristic of the data that is to be cached, and/or adjust one or more other characteristics of current and/or future caching operations. Additionally, or alternatively, the caching application(s) 129 may adjust a caching operational mode (e.g., on-demand caching, read-ahead caching, etc.) based on the usage information and/or other characteristics.

The caching application(s) 129 may be configured to monitor and/or adjust (e.g., establishing, terminating, restoring, etc.) connections with one or more data sources (of the aggregated data) and/or devices configured to access and/or otherwise utilize data associated with the data source(s). In one or more aspects, the monitoring of the connection(s) with the data source(s) and/or device(s) may be based on a caching status determined by the caching application(s) 129. The monitoring and/or adjusting of connection(s) may be in addition to such operations performed by the aggregation application(s) 128. Here, the caching application(s) 129 and the aggregation application(s) 128 may collaboratively perform the monitoring and/or adjusting of the connection(s). In other aspects, the monitoring and/or adjusting of the connection(s) may be performed by the caching application(s) 129 instead of the aggregation application(s) 128.

The aggregation application(s) 128 and/or caching application(s) 129 may be incorporated in, and may be a part of, database creation and manipulation software 127 and/or control logic 125.

Devices 105, 107, 109 may have similar or different architecture as described with respect to the computing device 101. Those of skill in the art will appreciate that the functionality of the computing device 101 (or device 105, 107, 109) as described herein may be spread across multiple data processing devices, for example, to distribute processing load across multiple computers, to segregate transactions based on geographic location, user access level, quality of service (QoS), etc. For example, devices 101, 105, 107, 109, and others may operate in concert to provide parallel computing features in support of the operation of control logic 125, software 127, networking and tracking applications 129.

The data transferred to and from various computing devices may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. For example, a file-based integration scheme or a service-based integration scheme may be utilized for transmitting data between the various computing devices. Data may be transmitted using various network communication protocols. Secure data transmission protocols and/or encryption may be used in file transfers to protect the integrity of the data, for example, File Transfer Protocol (FTP), Secure File Transfer Protocol (SFTP), and/or Pretty Good Privacy (PGP) encryption. In many aspects, one or more web services may be implemented within the various computing devices. Web services may be accessed by authorized external devices and users to support input, extraction, and manipulation of data between the various computing devices in the system 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. For example, secure network appliances may include built-in features such as hardware-accelerated SSL and HTTPS, WS-Security, and/or firewalls. Such specialized hardware may be installed and configured in the system 100 in front of one or more computing devices such that any external devices may communicate directly with the specialized hardware.

Having discussed several examples of computing devices which may be used to implement some aspects as discussed further below, discussion will now turn to a methods and architecture for dynamically caching and aggregation of data.

Figure 2:
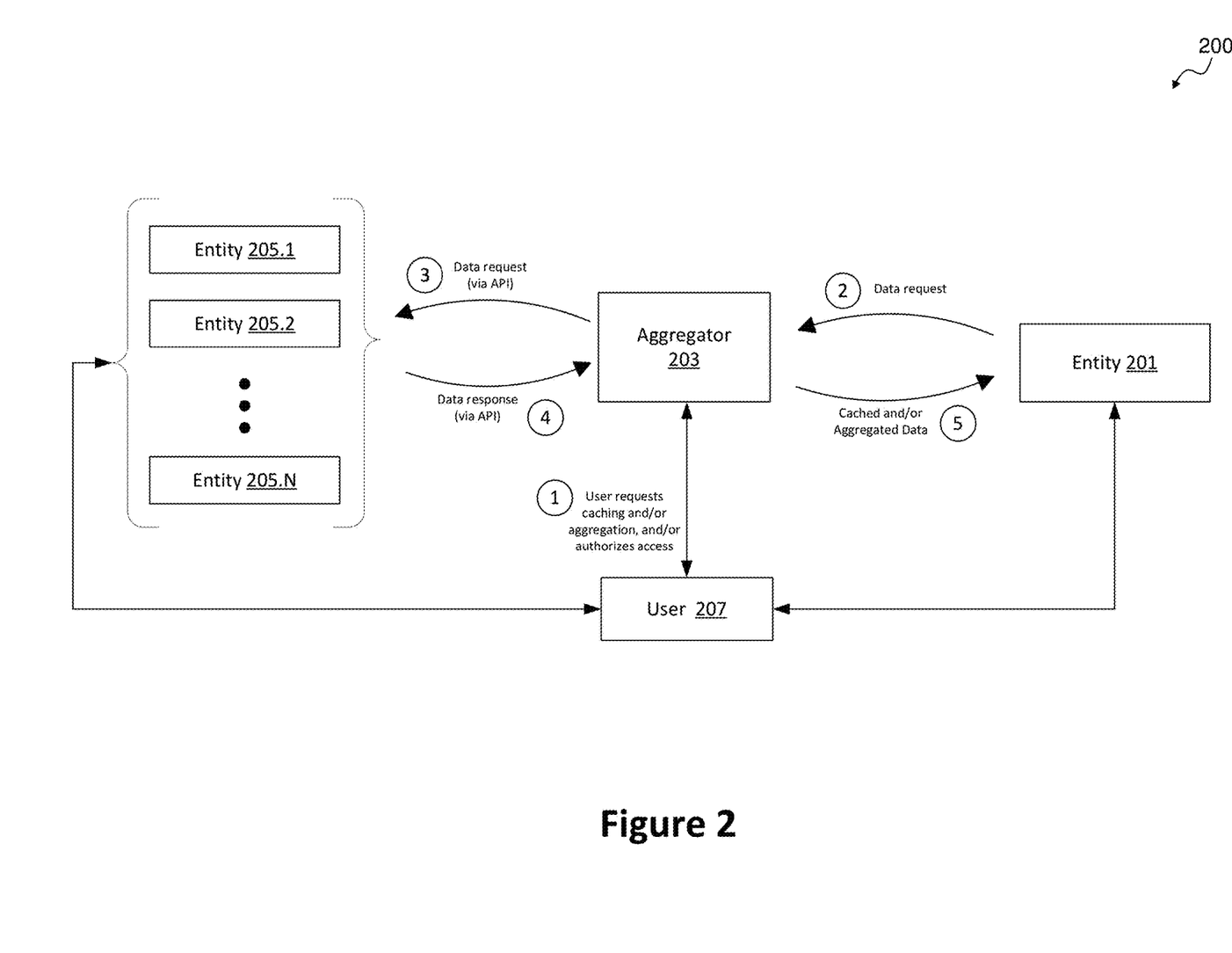
FIG. 2 shows a block diagram of an aggregation and caching system according to one or more aspects of the disclosure.

FIG. 2 is a block diagram of an aggregation and caching system 200. The system 200 (and/or one or more components therein) may be implemented by one or more devices of system 100 (e.g. computing device(s) 101, 105, 107, 109). For the ease of explanation, the aggregation and caching system 200 and exemplary operation thereof will be described with respect to the management of information using an information manager, such as a financial manager (e.g., personal finance management (PFM) application and/or service). However, as would be appreciated, the aggregation and caching system 200 is applicable to other data management implementations.

The system 200 may include entity 201, entity 203, and entity 205, as well as user device 207 associated with one or more users. The entity 201 may be associated with a first company or institution (e.g., an information user such as a PFM application and/or service), entity 203 (e.g., aggregator 203) may be associated with a second company or institution (e.g., aggregation servicer), entity 205 may be associated with a third company or institution (e.g., an information source such as a financial company, bank, insurance company, etc.), and user 207 may be a user device associated with one or more users associated with (e.g., having an account at) with entity 201, entity 205, and/or aggregator 203. The association of the user 207 allows the user 207 to exchange information with the entity 201, aggregator 203, and/or entity 205, which is illustrated by the connections between the user 207 and the entity 201, aggregator 203, and/or entity 205. For example, the user 207 may have an account associated with entity 205, which may be referred to as data provider 205 (e.g., bank) that includes information in which the user 207 authorizes the entity 201 (e.g., via the aggregator 203) and/or the aggregator 203 to access. Additionally, or alternatively, the user 207 may authorize the entity 201 to access information directly (i.e., without relying on the aggregator 203). Although entity 205 may be referred to as a data provider and entity 201 as a data user, data and/or information may be exchanged between the entities in a bi-directional manner.

In an exemplary operation, the user 207 may establish an association with (e.g., establish an account at) entity 201 and aggregator 203. At operation (1), the user 207 may authorize the aggregator 203 to access data (e.g., via an API) from entity 205 functioning as a provider. The authorization may additionally or alternatively authorize access to data at entity 201 by the aggregator 203. At operation (2), entity 201, such as a PFM application and/or service, may request data from entity 205 via the aggregator 203. Based on this request, the aggregator 203, at operation (3), establishes a connection with the entity 205, which may be via an API. The requested data is provided, as a response (e.g., via the API) to the aggregator 203 by the entity 205. The data response from the entity 205 may include data from two or more entities 205 and/or multiple data responses from one or more of the entities 205. The aggregator 203 may aggregate and/or cache data from the entities 205 to prepare aggregated and/or cached data. The aggregated and/or cached data may then be provided to the entity 201 and/or user 207. The aggregated and/or cached data may be provided: based on one or more requests from the entity 201 and/or user 207, in response to a completed aggregation and/or caching of data, periodically, and/or according to a schedule.

Entity 201, entity (aggregator) 203, and/or one or more of entities 205 may perform data caching. Caching from the various perspectives are described in more detail below.

Data Source/Provider Caching

One or more of the entities 205 may cache data that may be used by the aggregator 203, user 207, and/or entity 201. Additionally, or alternatively, the one or more of the entities 205 may control (and/or request) the aggregator 203, user 207, and/or entity 201 to cache data provided by the one or more of the entities 205.

Additionally, or alternatively, one or more of the entities 205 may monitor and/or adjust (e.g., establishing, terminating, restoring, etc.) connection(s) with the aggregator 203. In response to a terminated connection, the respective entity 205 may restore/reestablish its connection with the aggregator 203. One or more of the entities 205 may include aggregation application(s) 128 configured to monitor and/or adjust (e.g., establishing, terminating, restoring, etc.) connection(s). In one or more aspects, the monitoring of the connection(s) may be based on a caching status determined by caching application(s) 129 of the entit(ies) 205. The caching status may include: whether previous caching operation(s) successfully completed, a progress of one or more current caching operations, one or more quantities of data cached, error state(s), and/or one or more other parameters and/or information associated with caching operation(s). For example, the caching status may indicate that a caching operation failed to complete. Using this information, the aggregation application 128 may determine that one or more connections (e.g. via an API) with data source(s) have been terminated or are otherwise unavailable.

One or more of the entities 205 may cache data using one or more caching models of the caching application(s) 129 according to aspects of the disclosure. The caching models may be configured to perform data caching, including dynamic data caching, based on one or more characteristics, such as user characteristics, data characteristics, and/or one or more other characteristics and/or parameters.

In one or more aspects, the characteristics may include usage information, temporal information (e.g., date, time, etc.), user and/or data types, user and/or data classifications, account information, historical information (e.g., user behavioral information corresponding to past user behavior(s)), data and/or usage statistics, transaction information (e.g., financial transaction type, transaction classification, transaction amount, date and/or time of the transaction(s), etc.), user information (e.g., which may include user identification information), and/or other information or data. Additionally, or alternatively, the caching application(s) 129 may perform scheduled data caching and/or on-demand caching. In one or more aspects, the scheduled data caching may be dynamically adjusted based on one or more of the characteristics.

The data caching model(s) may include one or more ML caching models that may be automatically adapted based on one or more characteristics (e.g., user characteristics, data characteristics, and/or one or more other characteristics and/or parameters), data and/or information provided to (e.g., by the aggregation application(s) 128) and/or accessed by the caching application(s) 129, and/or data and/or information generated by the caching application(s) 129.

The usage information may indicate the frequency and/or degree in which the data is accessed and/or otherwise used by the aggregator 203, entity 201, and/or user 207. For example, the usage information may indicate an infrequent use of the data (provided from entity 205) by the aggregator 203, entity 201, and/or user 207, and this information may be used by the caching application(s) 129 to, for example, adjust one or more caching operations, such as adjusting (e.g., reducing) the frequency and/or quantity of data caching, adjust a type or other characteristic of the data that is to be cached, and/or adjust one or more other characteristics of current and/or future caching operations. In another example where the usage information may indicate a frequent use of the data by the aggregator 203, entity 201, and/or user 207, the usage information may be used to increase the frequency and/or quantity of data caching, adjust a type or other characteristic of the data that is to be cached, and/or adjust one or more other characteristics of current and/or future caching operations.

Additionally, or alternatively, the caching application(s) 129 may adjust a caching operational mode (e.g., on-demand caching, read-ahead caching, etc.) based on the usage information and/or other characteristics. For example, one or more of the entities 205 may cache data in anticipation of one or more requests from the aggregator 203 and/or user 207. This preemptive caching may be based on one or more characteristics, such as user characteristics, data characteristics, and/or one or more other characteristics and/or parameters, such as usage information, temporal information, user and/or data types, user and/or data classifications, account information, historical information, data and/or usage statistics, transaction information, user information, and/or other information or data. The preemptive caching may predict data in which the caching model anticipates (e.g., based on the characteristic(s) of the data) to be subsequently requested and/or otherwise accessed and/or used. The predicted data may then be preemptively cached to facilitate access to the data with improved efficiency and access speeds, as well as provides an increased availability of the data in the event of a terminated and/or degraded communicative connection with the data source.

Data User Caching

The entity 201 (e.g., PFM) may cache data received from the aggregator 203, user 207, and/or entit(ies) 205. Additionally, or alternatively, the entity 201 may control (and/or request) the aggregator 203, user 207, and/or entit(ies) 205 to cache data, where the cached data may be provided to the entity 201 and/or one or more other components of the system 200.

The entity 201 may monitor and/or adjust (e.g., establishing, terminating, restoring, etc.) connection(s) between the aggregator 203 and the entit(ies) 205 and/or between the entity 201 and the aggregator 203. In response to a terminated connection, the entity 201 may restore/reestablish a connection between the aggregator 203, and/or control (and/or request) the aggregator 203 and/or the entit(ies) 205 to restore/reestablish connection(s) between the aggregator 203 and the entit(ies) 205.

The entity 201 may include aggregation application(s) 128 configured to monitor and/or adjust (e.g., establishing, terminating, restoring, etc.) connection(s). In one or more aspects, the monitoring of the connection(s) may be based on a caching status determined by caching application(s) 129 of the entity 201. The caching status may include: whether previous caching operation(s) successfully completed, a progress of one or more current caching operations, one or more quantities of data cached, error state(s), and/or one or more other parameters and/or information associated with caching operation(s). For example, the caching status may indicate that a caching operation failed to complete. Using this information, the aggregation application 128 may determine that one or more connections (e.g. via an API) with data source(s) have been terminated or are otherwise unavailable.

The entity 201 may cache data using one or more caching models of the caching application(s) 129 (of the entity 201) according to aspects of the disclosure. The caching models may be configured to perform data caching, including dynamic data caching, based on one or more characteristics, such as user characteristics, data characteristics, and/or one or more other characteristics and/or parameters.

As discussed above, the characteristics may include usage information, temporal information (e.g., date, time, etc.), user and/or data types, user and/or data classifications, account information, historical information (e.g., user behavioral information corresponding to past user behavior(s)), data and/or usage statistics, transaction information (e.g., financial transaction type, transaction classification, transaction amount, date and/or time of the transaction(s), etc.), user information (e.g., which may include user identification information), and/or other information or data. Additionally, or alternatively, the caching application(s) 129 may perform scheduled data caching and/or on-demand caching. In one or more aspects, the scheduled data caching may be dynamically adjusted based on one or more of the characteristics. The data caching model(s) may include one or more ML caching models that may be automatically adapted based on one or more characteristics (e.g., user characteristics, data characteristics, and/or one or more other characteristics and/or parameters), data and/or information provided to (e.g., by the aggregation application(s) 128) and/or accessed by the caching application(s) 129, and/or data and/or information generated by the caching application(s) 129.

The usage information may indicate the frequency and/or degree in which the data is accessed and/or otherwise used by the aggregator 203, entit(ies) 205, and/or user 207. For example, the usage information may indicate an infrequent use of the data by aggregator 203, entit(ies) 205, and/or user 207, and this information may be used by the caching application(s) 129 to, for example, adjust one or more caching operations, such as adjusting (e.g., reducing) the frequency and/or quantity of data caching, adjust a type or other characteristic of the data that is to be cached, and/or adjust one or more other characteristics of current and/or future caching operations. In another example where the usage information may indicate a frequent use of the data by the aggregator 203, entit(ies) 205, and/or user 207, the usage information may be used to increase the frequency and/or quantity of data caching, adjust a type or other characteristic of the data that is to be cached, and/or adjust one or more other characteristics of current and/or future caching operations. Additionally, or alternatively, the caching application(s) 129 may adjust a caching operational mode (e.g., on-demand caching, read-ahead caching, etc.) based on the usage information and/or other characteristics. For example, the entity 201 may cache data in anticipation of one or more requests from the aggregator 203 and/or user 207. This preemptive caching may be based on one or more characteristics, such as user characteristics, data characteristics, and/or one or more other characteristics and/or parameters, such as usage information, temporal information, user and/or data types, user and/or data classifications, account information, historical information, data and/or usage statistics, transaction information, user information, and/or other information or data. The preemptive caching may predict data in which the caching model anticipates (e.g., based on the characteristic(s) of the data) to be subsequently requested. The predicted data may then be cached to facilitate access to the data with improved efficiency and access speeds, as well as provides an increased availability of the data in the event of a terminated and/or degraded communicative connection with the data source.

Aggregator Caching

The aggregator 203 may cache data received from the entity 201, user 207, and/or entit(ies) 205. Additionally, or alternatively, the aggregator 203 may control (and/or request) the entity 201, user 207, and/or entit(ies) 205 to cache data, where the cached data may be provided to the aggregator 203 and/or one or more other components of the system 200. The received cached provided to the aggregator 203 may aggregate the cached data as discussed in more detail below.

The aggregator 203 may monitor and/or adjust (e.g., establishing, terminating, restoring, etc.) connection(s): between the aggregator 203 and the entit(ies) 205, between the entity 201 and the aggregator 203, and/or between the user 207 and the aggregator 203. In response to a terminated connection, the aggregator 203 may restore/reestablish the connection(s) between the aggregator 203 and: entity 201, entit(ies) 205, and/or user 207, and/or control (and/or request) the entity 201, the entit(ies) 205, and/or user 207 to restore/reestablish connection(s) with the aggregator 203.

The aggregator 203 may include aggregation application(s) 128 configured to monitor and/or adjust (e.g., establishing, terminating, restoring, etc.) connection(s). In one or more aspects, the monitoring of the connection(s) may be based on a caching status determined by caching application(s) 129 of the aggregator 203. The caching status may include: whether previous caching operation(s) successfully completed, a progress of one or more current caching operations, one or more quantities of data cached, error state(s), and/or one or more other parameters and/or information associated with caching operation(s). For example, the caching status may indicate that a caching operation failed to complete. Using this information, the aggregation application 128 may determine that one or more connections (e.g. via an API) with data source(s) have been terminated or are otherwise unavailable.

The aggregator 203 may cache data using one or more caching models of the caching application(s) 129 (of the aggregator 203) according to aspects of the disclosure. The caching models may be configured to perform data caching, including dynamic data caching, based on one or more characteristics, such as user characteristics, data characteristics, and/or one or more other characteristics and/or parameters.

As discussed above, the characteristics may include usage information, temporal information (e.g., date, time, etc.), user and/or data types, user and/or data classifications, account information, historical information (e.g., user behavioral information corresponding to past user behavior(s)), data and/or usage statistics, transaction information (e.g., financial transaction type, transaction classification, transaction amount, date and/or time of the transaction(s), etc.), user information (e.g., which may include user identification information), and/or other information or data. Additionally, or alternatively, the caching application(s) 129 may perform scheduled data caching and/or on-demand caching. In one or more aspects, the scheduled data caching may be dynamically adjusted based on one or more of the characteristics. The data caching model(s) may include one or more ML caching models that may be automatically adapted based on one or more characteristics (e.g., user characteristics, data characteristics, and/or one or more other characteristics and/or parameters), data and/or information provided to (e.g., by the aggregation application(s) 128) and/or accessed by the caching application(s) 129, and/or data and/or information generated by the caching application(s) 129.

The usage information may indicate the frequency and/or degree in which the data is accessed and/or otherwise used by the entity 201, entit(ies) 205, and/or user 207. For example, the usage information may indicate an infrequent use of the data by entity 201, entit(ies) 205, and/or user 207, and this information may be used by the caching application(s) 129 to, for example, adjust one or more caching operations, such as adjusting (e.g., reducing) the frequency and/or quantity of data caching, adjust a type or other characteristic of the data that is to be cached, and/or adjust one or more other characteristics of current and/or future caching operations. In another example where the usage information may indicate a frequent use of the data by the entity 201, entit(ies) 205, and/or user 207, the usage information may be used to increase the frequency and/or quantity of data caching, adjust a type or other characteristic of the data that is to be cached, and/or adjust one or more other characteristics of current and/or future caching operations. Additionally, or alternatively, the caching application(s) 129 may adjust a caching operational mode (e.g., on-demand caching, read-ahead caching, etc.) based on the usage information and/or other characteristics. For example, the aggregator 203 may cache data in anticipation of one or more requests from the entity 201 and/or user 207 (and/or entit(ies) 205). This preemptive caching may be based on one or more characteristics, such as user characteristics, data characteristics, and/or one or more other characteristics and/or parameters, such as usage information, temporal information, user and/or data types, user and/or data classifications, account information, historical information, data and/or usage statistics, transaction information, user information, and/or other information or data.

According to one or more aspects, the system 200 may include aggregation application(s) 128 and/or caching application(s) 129 that may be distributed across two or more of the entit(ies) 205, aggregator 203, entity 201, and/or user devices 207, where the distributed applications may be configured to collaboratively perform the functions and/or operations of the aggregation application(s) 128 and/or caching application(s) 129, such as those functions and operations according to the disclosure. Additionally, or alternatively, one or more of the components 201, 203, 205, and/or 207 of the system 200 may be distributed across two or more virtual and/or physical devices (e.g., devices 101, 105, 107, 109 of FIG. 1). For example, one or more of the entities 205, aggregator 203, and/or entity 201 may be implemented as multiple, distributed servers, such as in a cloud-based computing environment. Further, a set of devices may perform one or more functions described as being performed by another set of devices. The aggregation system 200 may be an embodiment of the system 100 of FIG. 1 in one or more aspects.

In an exemplary aspect, one or more operations/functions of the systems 100, 200, and/or components therein, may be performed using a machine learning (ML) model. For example, the validation of data and/or resources may be validated using the ML model. The machine learning model may support a generative adversarial network, a bidirectional generative adversarial network, an adversarial autoencoder, transformer-based network (e.g., Seq2Seq), or an equivalent thereof. Additionally, or alternatively, the machine learning model may be a neural network, such as convolutional neural network (CNN), a recurrent neural network, a recursive neural network, a long short-term memory (LSTM), a gated recurrent unit (GRU), an unsupervised pretrained network, a space invariant artificial neural network, a generative adversarial network (GAN), or a consistent adversarial network (CAN), cyclic generative adversarial network (C-GAN), a deep convolutional GAN (DC-GAN), GAN interpolation (GAN-INT), GAN-CLS, a cyclic-CAN (e.g., C-CAN) or any equivalent thereof. Additionally, or alternatively, the one or more ML models may comprise one or more decision trees. In some instances, the one or more machine learning models may comprise a Hidden Markov Model. The ML model may be trained based on input data (e.g., validation requests) and/or output data (e.g., validation results), feedback provided by one or more users via the user interface, and/or or other information. The machine learning model may be trained using different training techniques, such as supervised training, unsupervised training, semi-supervised training back propagation, transfer learning, stochastic gradient descent, learning rate decay, dropout, max pooling, batch normalization, and/or any equivalent deep learning technique.

Figure 3:
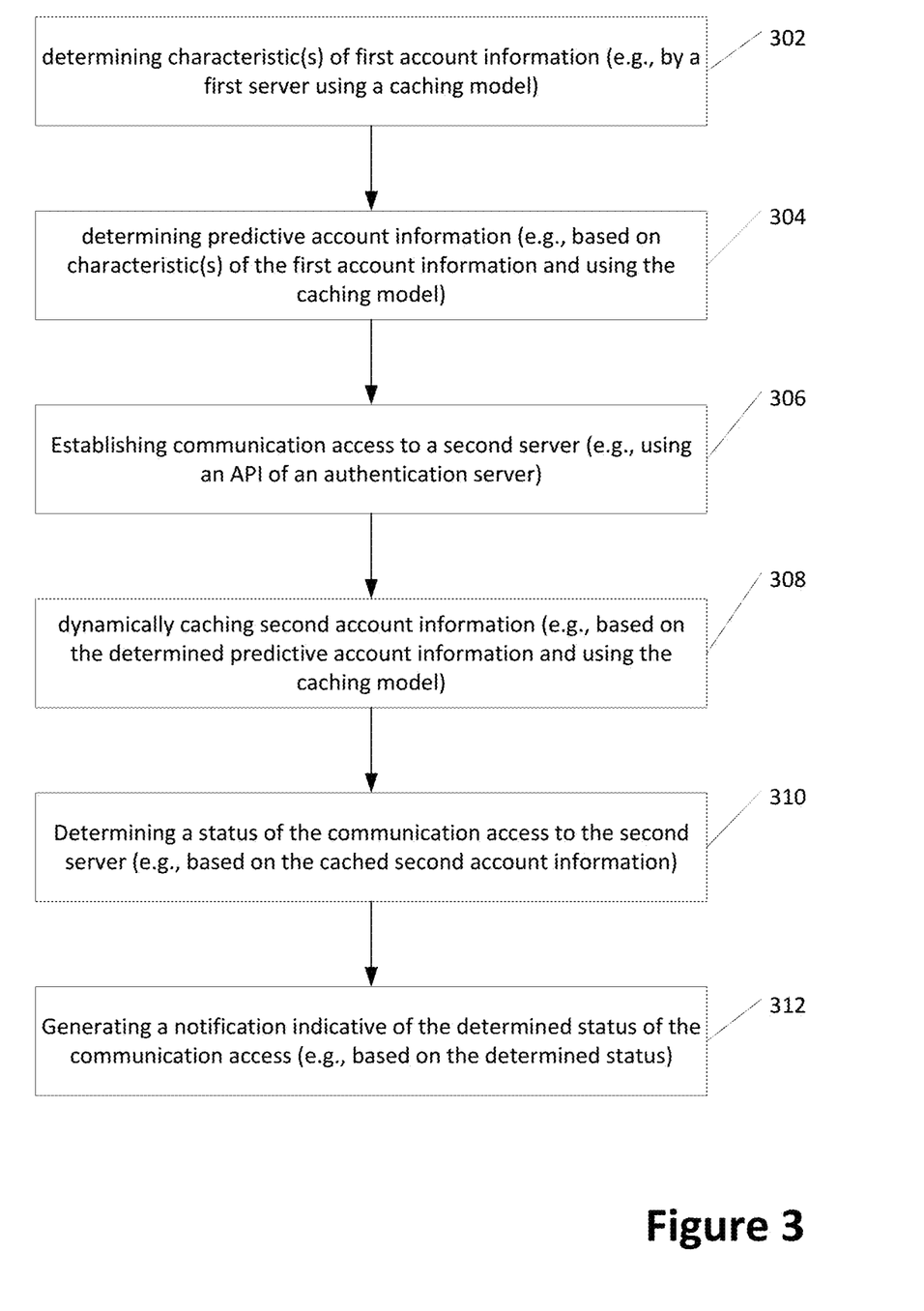
FIG. 3 shows a flowchart of a caching method according to one or more aspects of the disclosure.

FIG. 3 is a flowchart for a data caching method 300. Some or all of the operations of process 300 may be performed using one or more computing devices as described herein, such as computing device 101. Operations may be performed sequentially, at least partially concurrently, concurrently, or simultaneously. Additionally, or alternatively, the operation(s) may be iteratively performed (e.g., until one or more conditions is satisfied).

The process 300 begins as operation 302, where one or more characteristics of first account information may be determined. The determination may be based on a caching model. Additionally, or alternatively, a first server (e.g., a PFM server, entity 201 in FIG. 2) may be configured to perform the determination. The first account information may be account information associated with one or more users associated the PFM server. The characteristics may include usage information, temporal information (e.g., date, time, etc.), user and/or data types, user and/or data classifications, account information, historical information (e.g., user behavioral information corresponding to past user behavior(s)), data and/or usage statistics, transaction information (e.g., financial transaction type, transaction classification, transaction amount, date and/or time of the transaction(s), etc.), user information (e.g., which may include user identification information), and/or other information or data. For example, the characteristic(s) of the first account information may include access information corresponding to an access of the first account information by a user associated with the first account information, one or more transactions associated with the user, temporal information of the one or more transactions, a transaction type of the one or more transactions, and/or an account type.

The process 300 transitions to operation 304, where predictive account information may be determined. The predictive account information may be determined by the first server. The determination may use the caching model (e.g., a ML caching model) and/or be based on the one or more characteristics of the first account information. For example, the caching model(s) may be configured to determine the predictive account information based on the first account information and/or characteristics thereof. The caching model(s) may then determine subsequent data (e.g., second account information in operation 308) to cache based on the predictive account information. The caching model(s) may process and/or analyze the first account information to predict data (e.g., based on the characteristic(s) of the data) likely to be subsequently requested and/or otherwise accessed and/or used (e.g., by the first server and/or user associated with the account data). The predicted data may then be cached to facilitate future access to the data with improved efficiency and access speeds, as well as provides an increased availability of the data in the event of a terminated and/or degraded communicative connection with the data source.

Additionally, or alternatively, the caching model may be automatically adapted (e.g., by the first server and/or based on one or more access characteristics of the first account information) to generate an adapted caching model. The adapted caching model may be used to dynamically cache the subsequent data (e.g., second account information).

The process 300 transitions to operation 306, where communication access to a second server (e.g., entity 205, such as a financial institution and/or other data source/provider) may be established. The communication access may be established via an application programming interface (API). The API may be implemented by a third server (e.g., an authentication server). The third server may be configured as an aggregator, such as aggregator 203 of FIG. 2.

The user may authorize the access to their associated data at the second and/or first servers by the third server (and its associated API). Additionally, or alternatively, the user associated with the second account information may be authenticated (e.g., by the third server) and/or using the API. In this example, the communication access with the second server may be established based on the authentication of the user.

The first account information may be obtained from the second server by the first server in a previously established communication access to the second server. Alternatively, the communication access may be established to facilitate the access to the first account information, where this communication access may be maintained to further facilitate the access subsequent account information (e.g., second account information in operation 308).

The process 300 transitions to operation 308, where second account information may be (e.g., dynamically) cached from the second server by the first server (e.g., using caching application(s) 129). The caching may be made via the API and/or using the caching model(s). The dynamic caching of the second account information may be based on the determined predictive account information. Additionally, or alternatively, the second account information may be aggregated (e.g., using aggregation application(s) 128), where the cached information includes aggregated data of the second account information.

The caching may be performed by the caching model(s), which may be configured to perform data caching, including dynamic data caching, based on one or more characteristics of the first and/or second account information. The characteristic(s) may include user characteristics, data characteristics, and/or one or more other characteristics and/or parameters. The cached to facilitate future access to the data with improved efficiency and access speeds, as well as provides an increased availability of the data in the event of a terminated and/or degraded communicative connection with the data source. Additionally, or alternatively, the dynamic caching of the second account information may be based on the first account information, characteristic(s) of the first account information, the second account information, characteristic(s) of the second account information, user information, and/or other information and/or parameters. For example, the caching of the second account information may include determining (e.g., by the first server and/or using the caching model) the second account information to be cached by the first server based on the predictive account information, accessing (e.g., by the first server and/or using the API) the second account information to be cached from the second server, retrieving (e.g., by the first server and from the second server) the accessed second account information to be cached, and caching (e.g., based on the predictive account information) the retrieved second account information in a database of the first server.

The data caching may include determining a unique identifier of the second account information, determining an access of the second account information (e.g., by a user associated with the second account information), and providing (e.g., based on the determined access) the unique identifier (e.g., as a notification) to the second server to notify the second server of the access (e.g., by the user). This notification may be used to adapt and/or otherwise adjust a future caching operation, and/or to adapt the caching model. For example, the notification may indicate the usage of the cached data, where the degree of usage may be used to improve the future caching operation(s). In this example, if the notification indicates that the cached data was not used and/or used to a lesser degree than anticipated, the future caching operation(s) may be adjusted to adjust (e.g., reduce) the amount of similar data cached by the future caching operation(s).

The determination of the unique identifier may include hashing the second account information to generate a hash corresponding to the (e.g., accessed) second account information and/or determining a feature vector representing the second account information.

The process 300 transitions to operation 310, where a status of the communication access to the second server may be determined by the first server. The determination may be based on the cached second account information. The status of the communication access may be determined using aggregation application(s) 128 configured to perform monitoring and/or adjusting (e.g., establishing, terminating, restoring, etc.) of the communication access (e.g., connections) with between the first and second servers. In one or more aspects, the monitoring of the communication access may be based on a caching status determined by the caching operations (e.g., by the caching of the second account information in operation 308). For example, the caching status may include: whether previous caching operation(s) successfully completed, a progress of one or more current caching operations, one or more quantities of data cached, error state(s), and/or one or more other parameters and/or information associated with caching operation(s). The caching status may indicate that a caching operation failed to complete. Using this information, it may be determined that the communication access is unavailable, compromised, and/or otherwise diminished/degraded.

The process 300 transitions to operation 312, where a notification indicative of the determined status of the communication access may be generated. The notification may be generated based on the determined status. For example, the notification may be generated (e.g., by processor 111) and provided via the I/O interface 119.

Figure 4:
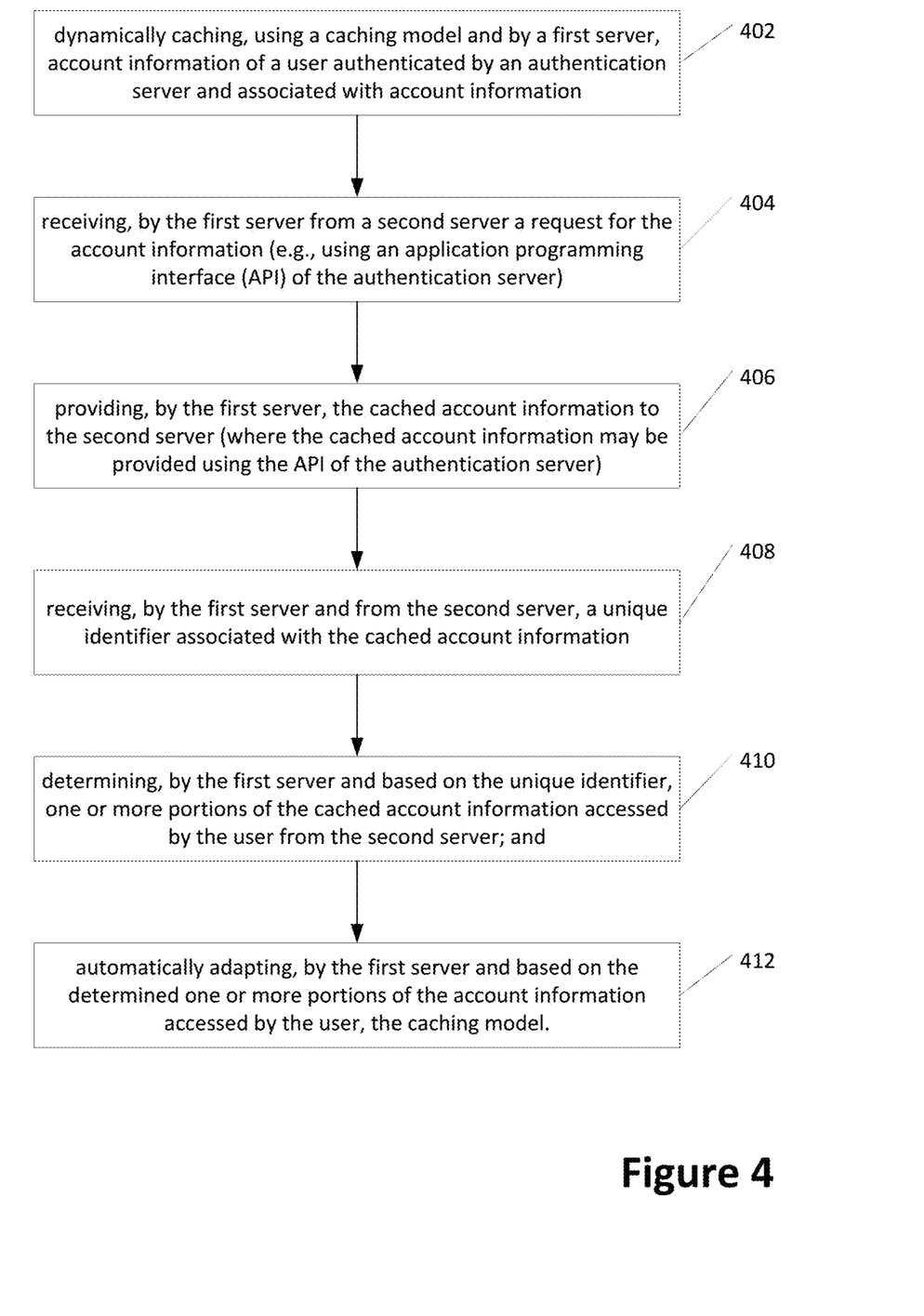
FIG. 4 shows a flowchart of a caching method according to one or more aspects of the disclosure.

FIG. 4 is a flowchart for a caching method 400. Some or all of the operations of process 300 may be performed using one or more computing devices as described herein, such as computing device 101. Operations may be performed sequentially, at least partially concurrently, concurrently, or simultaneously. Additionally, or alternatively, the operation(s) may be iteratively performed (e.g., until one or more conditions is satisfied).

The process 400 begins as operation 402, where account information associated with a user (e.g., authenticated by an authentication server) may be dynamically cached (e.g., by a first server and/or using a caching model).

The first server may be a data source (e.g., entity 205, such as a financial institution and/or other data source/provider), which may provide a data user (e.g., second server, such as a PFM server, entity 201 in FIG. 2) with data, including cached data, via an authentication server (e.g., via its application programming interface (API)). The authentication server may be configured as an aggregator, such as aggregator 203 of FIG. 2).

The caching of the account information may be performed using caching application(s) 129, which may include the caching model(s). Additionally, or alternatively, the account information may be aggregated (e.g., using aggregation application(s) 128), where the cached information includes aggregated data of the account information. The caching model(s) may be configured to perform data caching, including dynamic data caching, based on one or more characteristics of the account information. The characteristic(s) may include user characteristics, data characteristics, and/or one or more other characteristics and/or parameters. The data may be cached to facilitate future access to the data with improved efficiency and access speeds, as well as provides an increased availability of the data in the event of a terminated and/or degraded communicative connection with the data source.

The process 400 transitions to operation 404, where a request for the account information may be received. The request may be received by the first server from a second server (e.g., from PFM server 201 via aggregator 203). The request may be received using an application programming interface (API) of the authentication server (e.g. aggregator 203). For example, a PFM application hosted by PFM server 201 may request data (e.g., data associated with user 207, such as account information) from a servicer (e.g., financial institution) associated with the user.

The process 400 transitions to operation 406, where the cached account information may be provided (by the first server) to the second server (e.g., from the financial institution server to the PFM server). The cached account information may be provided based on the received request and/or using the API of the authentication server.

The process 400 transitions to operation 408, where the first server may receive a unique identifier (from the second server) associated with the cached account information sent to the second server. For example, the unique identifier may be determined that uniquely identifies the cached account information or a portion thereof, and may be used by the first server to adapt one or more caching and/or aggregation operations. The unique identifier may include: a hash corresponding to the cached account information and/or a feature vector representing the cached account information. The unique identifier may be determined by the second server and/or the authentication server.

The process 400 transitions to operation 410, where portion(s) of the cached account information accessed by the user from the second server may be determined (e.g., by the first server and/or based on the unique identifier). For example, the first server may determine if the cached account information or one or more portions thereof are accessed or otherwise used by the second server and/or the user. In this example, accessing of the cached account information (e.g., by a user associated with the cached account information) may be determined by processing the unique identifier. The unique identifier may function as a notification to the first server that the cached account information provided to the second server has been accessed (e.g., used by the user). In the example in which the account information includes financial data, such as an account balance, the unique identifier may be used to notify the first server that the user has access their account balance based on the cached account data.

The unique identifier may be used to adapt and/or otherwise adjust a future caching operation as described in more detail below in operation 412.

The process 400 transitions to operation 412, where the caching model may be automatically adapted (e.g., by the first server and/or based on the determined portion(s) of the account information accessed by the user. Using the determined portion(s) of the account information access by the user (e.g., using the unique identifier), the first server may adapt the caching model. For example, the first server may determine, based on the determined accessed portion(s) using the unique identifier, the usage of the cached data, where the degree of usage may be used to improve the future caching operation(s). In this example, if the determination indicates that the cached data was not used and/or used to a lesser degree than anticipated, the future caching operation(s) may be adjusted to adjust (e.g., reduce) the amount of similar data cached by the future caching operation(s).

The adapted caching model may be used for one or more further caching operations. For example, the first server may dynamically cache additional account information of the user using the adapted caching model. The additional cached account information may be provided (e.g., by the first server using the API of the authentication server) to the second server. In one or more aspects, the additional cached account information may be provided automatically in an unsolicited manner and in anticipation of a future request by the second server for the additional account information. This automatic distribution of the additional cached data One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like. that perform particular tasks or implement particular abstract data types when executed by a processor in a computer or other device. The modules may be written in a source code programming language that is subsequently compiled for execution, or may be written in a scripting language such as (but not limited to) Python, Perl, or any other suitable scripting language. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. Any sequence of computer-implementable instructions described in this disclosure may be considered to be an "algorithm" as those instructions are intended to solve one or more classes of problems or to perform one or more computations. While various directional arrows are shown in the figures of this disclosure, the directional arrows are not intended to be limiting to the extent that bi-directional communications are excluded. Rather, the directional arrows are to show a general flow of steps and not the unidirectional movement of information. In the entire specification, when an element is referred to as "comprising" or "including" another element, the element should not be understood as excluding other elements so long as there is no special conflicting description, and the element may include at least one other element. In addition, the terms "unit" and "module", for example, may refer to a component that exerts at least one function or operation, and may be realized in hardware or software, or may be realized by combination of hardware and software. In addition, terms such as " . . . unit," " . . . module" described in the specification mean a unit for performing at least one function or operation, which may be implemented as hardware or software, or as a combination of hardware and software. Throughout the specification, expression "at least one of a, b, and c" may include 'a only,' 'b only,' 'c only,' 'a and b,' 'a and c,' 'b and c,' and/or 'all of a, b, and c.'

It is noted that various connections between elements are discussed in the following description. It is noted that these connections are general and, unless specified otherwise, may be direct or indirect, and that the specification is not intended to be limiting in this respect. As described herein, thresholds are referred to as being "satisfied" to generally encompass situations involving thresholds above increasing values as well as encompass situations involving thresholds below decreasing values. The term "satisfied" is used with thresholds to address when values have passed a threshold and then approaching the threshold from an opposite side as using terms such as "greater than," "greater than or equal to," "less than," and "less than or equal to" can add ambiguity where a value repeated crosses a threshold.

What is claimed is:

1. A computer-implemented method comprising:
   determining, by a first server and using a caching model, one or more characteristics of first account information;

determining, by the first server using the caching model and based on the one or more characteristics of the first account information, predictive account information;

establishing, by the first server and using an application programming interface (API) of an authentication server, communication access to a second server;

dynamically caching, by the first server via the API and using the caching model, second account information from the second server, wherein the dynamic caching of the second account information is based on the determined predictive account information;

determining, by the first server and based on the cached second account information, a status of the communication access to the second server; and generating, based on the determined status, a notification indicative of the determined status of the communication access.

2. The computer-implemented method of claim 1, wherein the first account information has been obtained from the second server by the first server in a previously established communication access to the second server.

3. The computer-implemented method of claim 1, further comprising authenticating, by the authentication server and using the API, a user associated with the second account information, wherein the communication access with the second server is established based on the authentication of the user.

4. The computer-implemented method of claim 1, wherein dynamically caching the second account information comprises:

determining, by the first server and using the caching model, the second account information to be cached by the first server based on the predictive account information;

accessing, by the first server and using the API, the second account information to be cached from the second server;

retrieving, by the first server and from the second server, the accessed second account information to be cached; and caching, based on the predictive account information, the retrieved second account information in a database of the first server.

5. The computer-implemented method of claim 1, wherein the one or more characteristics of the first account information comprises: access information corresponding to an access of the first account information by a user associated with the first account information; one or more transactions associated with the user; temporal information of the one or more transactions; a transaction type of the one or more transactions; or an account type.

6. The computer-implemented method of claim 1, further comprising automatically adapting, by the first server and based on one or more access characteristics of the first account information, the caching model to generate an adapted caching model, wherein the second account information is dynamically cached based on the adapted caching model.

7. The computer-implemented method of claim 6, wherein the caching model is a machine-learning caching model.

8. The computer-implemented method of claim 1, further comprising:

determining a unique identifier of the second account information;

determining an access of the second account information by a user associated with the second account information; and providing, based on the determined access, the unique identifier to the second server to notify the second server of user access.

9. The computer-implemented method of claim 8, wherein determining the unique identifier comprises:

hashing the second account information to generate a hash corresponding to the second account information accessed by the user, or determining a feature vector representing the second account information.

10. The computer-implemented method of claim 1, further comprising:

providing, by the first server and to the second server via the API of the authentication server, a notification corresponding to a user access of the second account information by a user associated with the second account information; and receiving, by the first server and from the second server via the API of the authentication server, anticipated account information, wherein the anticipated account information is determined by the second server based on the notification from the first server.

11. A computing device comprising:

one or more processors; and memory storing instructions that, when executed by the one or more processors, configure the computing device to:

predict, using a caching model and based on one or more user characteristics of a user, predictive account information;

access, from a server using an application programming interface (API) of an authentication server, account information associated with the user;

dynamically cache, using the caching model and based on the predictive account information, a portion of the accessed account information, wherein the cached portion of the account information is accessible to the user using the authentication server;

determine a user access of the cached portion of the account information by the user; and automatically adapt, based on the determined user access, the caching model, wherein other account information subsequently accessed from the server is dynamically cached using the adapted caching model.

12. The computing device of claim 11, wherein the instructions, when executed by the one or more processors, further configure the computing device to authenticate, using the authentication server and via the API, the user associated with the account information, wherein the access of the account information is authorized based on the authentication of the user.

13. The computing device of claim 11, wherein the instructions, when executed by the one or more processors, further configure the computing device to determine, based on the cached account information, an accessibility status of the server.

14. The computing device of claim 13, wherein the instructions, when executed by the one or more processors, further configure the computing device to generate, based on the determined accessibility status, a notification indicative of an accessibility of the server.

15. The computing device of claim 11, wherein the caching model is a machine-learning caching model.

16. The computing device of claim 11, wherein the instructions, when executed by the one or more processors, further configure the computing device to:
- determine, based on the user access, a unique identifier of the accessed account information; and
- provide the unique identifier to the server to notify the server of the user access.

17. The computing device of claim 16, wherein determining the unique identifier comprises hashing the accessed account information accessed by the user to generate a hash corresponding to the accessed account information accessed by the user.

18. The computing device of claim 11, wherein the instructions, when executed by the one or more processors, further configure the computing device to:
- automatically access, using the adapted caching model and from the server via the API, additional account information associated with the user; and
- dynamically cache, using the adapted caching model and based on an anticipated user access by the user, a portion of the accessed additional account information, as anticipated cached account information, wherein the anticipated cached account information is accessible to the user using the authentication server.

19. A computer-implemented method comprising:
- dynamically caching, by a first server and using a caching model, account information of a user authenticated by an authentication server and associated with the account information;
- receiving, by the first server from a second server using an application programming interface (API) of the authentication server, a request for the account information;
- providing, by the first server and based on the received request, the cached account information to the second server, wherein the cached account information is provided using the API of the authentication server;
- receiving, by the first server and from the second server, a unique identifier associated with the cached account information;
- determining, by the first server and based on the unique identifier, one or more portions of the cached account information accessed by the user from the second server; and
- automatically adapting, by the first server and based on the determined one or more portions of the account information accessed by the user, the caching model.

20. The computer-implemented method of claim 19, further comprising:
- dynamically caching, by the first server and using the adapted caching model, additional account information of the user; and
- automatically providing, by the first server using the API of the authentication server, the cached additional account information to the second server in an unsolicited manner and in anticipation of a future request by the second server for the additional account information.

* * * * *